UNITED STATES PATENT OFFICE.

FREDERICK O. LYON, OF WALTHAM, MASSACHUSETTS.

IMITATION STAINED GLASS.

SPECIFICATION forming part of Letters Patent No. 326,572, dated September 22, 1885.

Application filed February 11, 1885. (Specimens.)

*To all whom it may concern:*

Be it known that I, FREDERICK O. LYON, of Waltham, in the county of Middlesex and State of Massachusetts, have invented certain Improvements in Imitation Stained Glass, of which the following is a specification.

The object of my invention is to provide a simple method for producing a cheap and durable imitation of stained glass. To effect this, I first adhere to plain glass, by the use of any good strong adhesive suitable for this kind of work, thin narrow strips of rubber, which are molded for this particular purpose in such a manner as to make figures or designs of various forms upon said glass, and which rubbers, when so placed upon plain glass, have the form and appearance of the leads now used in stained-glass windows. I then prepare a composition of shellac varnish, aniline dye, and alcohol by dissolving one part dye with two parts alcohol, and mixing well with eleven parts shellac varnish, which, after being well shaken and applied with a brush in an even manner upon the glass between the rubbers, (any desired color being obtained by using the different colored dyes in the same proportion,) produces the combination of colors as seen in ordinary stained-glass windows, while the whole is a perfect imitation in appearance of stained-glass windows.

I find the composition soon hardens after being applied, leaving a clear, smooth, glassy surface, which withstands the wear and tear of the weather in a remarkable manner. It will stand frequent washing and hard rubbing. It hardens and becomes firmer in the sun's rays, and is in every way durable.

Care should be taken, if the alcohol escapes, to add more, as the composition must be thin when applied.

The rubbers prevent the different colors from uniting.

This process may be applied to one or both sides.

I claim—

1. A method of using rubber on imitation stained glass in place of the leads.

2. The coloring of the intermediate spaces, as described in the specification.

3. Plain glass, partitioned on one or both sides with rubber, and the coloring of the intermediate spaces, as above described.

In testimony whereof I have signed my name to the specification, in the presence of two subscribing witnesses, this 31st day of January, 1885.

FREDERICK O. LYON.

Witnesses:
CHAS. L. ABBOTT,
ALBERT H. TARBELL.